(12) United States Patent
Matsumura et al.

(10) Patent No.: US 12,431,500 B2
(45) Date of Patent: Sep. 30, 2025

(54) CATHODE MATERIAL AND BATTERY

(71) Applicant: Panasonic Intellectual Property Management Co., Ltd., Osaka (JP)

(72) Inventors: Tadaaki Matsumura, Shiga (JP); Izuru Sasaki, Kyoto (JP); Yuta Sugimoto, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 4 days.

(21) Appl. No.: 18/219,210

(22) Filed: Jul. 7, 2023

(65) Prior Publication Data

US 2023/0352690 A1    Nov. 2, 2023

Related U.S. Application Data

(60) Division of application No. 16/931,113, filed on Jul. 16, 2020, now Pat. No. 11,749,803, which is a
(Continued)

(30) Foreign Application Priority Data

| Jan. 26, 2018 | (JP) | 2018-011533 |
| Jan. 26, 2018 | (JP) | 2018-011534 |
| Aug. 19, 2018 | (JP) | 2108-173451 |

(51) Int. Cl.
*H01M 4/62* (2006.01)
*H01M 4/131* (2010.01)
(Continued)

(52) U.S. Cl.
CPC ............ *H01M 4/62* (2013.01); *H01M 4/131* (2013.01); *H01M 4/366* (2013.01); *H01M 4/505* (2013.01);
(Continued)

(58) Field of Classification Search
CPC ........ H01M 4/131; H01M 4/62; H01M 4/525; H01M 4/505; H01M 4/366;
(Continued)

(56) References Cited

U.S. PATENT DOCUMENTS

| 7,993,782 B2 | 8/2011 | Takada et al. |
| 11,749,803 B2 * | 9/2023 | Matsumura ............. H01M 4/62 429/322 |

(Continued)

FOREIGN PATENT DOCUMENTS

| JP | 8-171938 | 7/1996 |
| JP | 2006-244734 | 9/2006 |

(Continued)

OTHER PUBLICATIONS

International Search Report of PCT application No. PCT/JP2018/043358 dated Feb. 26, 2019.
(Continued)

*Primary Examiner* — Laura Weiner
(74) *Attorney, Agent, or Firm* — Rimon P.C.

(57) ABSTRACT

Provided is a cathode material including a cathode active material; a coating layer which coats at least a part of a surface of the cathode active material, and which includes a first solid electrolyte material; and a second solid electrolyte material. The first solid electrolyte material includes Li, M, and X; however, does not include sulfur. M includes at least one element selected from the group consisting of metalloid elements and metal elements other than Li. X includes at least one element selected from the group consisting of Cl and Br.

3 Claims, 2 Drawing Sheets

Related U.S. Application Data continuation of application No. PCT/JP2018/043358, filed on Nov. 26, 2018.

(51) Int. Cl.
| | |
|---|---|
| *H01M 4/36* | (2006.01) |
| *H01M 4/505* | (2010.01) |
| *H01M 4/525* | (2010.01) |
| *H01M 10/0525* | (2010.01) |
| *H01M 10/0562* | (2010.01) |
| *H01M 50/431* | (2021.01) |
| *H01M 4/02* | (2006.01) |

(52) U.S. Cl.
CPC ....... *H01M 4/525* (2013.01); *H01M 10/0525* (2013.01); *H01M 10/0562* (2013.01); *H01M 50/431* (2021.01); *H01M 2004/028* (2013.01)

(58) Field of Classification Search
CPC ....... H01M 2004/028; H01M 10/0525; H01M 10/0562; H01M 50/431
See application file for complete search history.

(56) References Cited

U.S. PATENT DOCUMENTS

| | | |
|---|---|---|
| 2010/0273062 A1 | 10/2010 | Tsuchida et al. |
| 2011/0027661 A1 | 2/2011 | Okazaki et al. |
| 2012/0052396 A1 | 3/2012 | Tsuchida et al. |
| 2013/0260258 A1 | 10/2013 | Tsuchida et al. |
| 2014/0087270 A1 | 3/2014 | Yoshida |
| 2014/0377627 A1 | 12/2014 | Furuya et al. |
| 2015/0228966 A1 | 8/2015 | Kintaka |
| 2016/0204467 A1 | 7/2016 | Nogami et al. |

FOREIGN PATENT DOCUMENTS

| | | |
|---|---|---|
| JP | 2009-193940 | 8/2009 |
| JP | 4982866 B | 7/2012 |
| JP | 2014-241282 | 12/2014 |
| JP | 2016-189339 | 11/2016 |
| WO | 2012/077225 | 6/2012 |

OTHER PUBLICATIONS

Andreas Bohnsack et al., "The Bromides Li3MBr6 (M=Sm—Lu, Y): Synthesis, Crystal Structure, and Ionic Mobility", Journal of Inorganic and General Chemistry, Sep. 1997, vol. 623/Issue 9, pp. 1352-1356.

Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of Inorganic and General Chemistry, Jul. 1997, vol. 623/Issue 7, pp. 1067-1073.

Y. Tomita et al., "Li ion conductivity in the doped Li3InBr6", Proceedings for the 70th Anniversary Meeting of the Electrochemical Society of Japan, Date of printing: Mar. 18, 2003, Date of issuance: Mar. 25, 2003, Edited by: Convention Planning Committee, the Electrochemical Society of Japan, Issued by: The Electrochemical Society of Japan.

William D. Richards et al., "Interface Stability in Solid-State Batteries", Chemistry of Materials, 2016, vol. 28, Dec. 7, 2015, pp. 266-273.

Extended European Search Report dated Feb. 22, 2021 for the related European Patent Application No. 18902206.4.

Non-Final Office Action issued in U.S. Appl. No. 16/931,113, dated Jan. 9, 2023.

Final Office Action issued in U.S. Appl. No. 16/931,113, dated Mar. 16, 2023.

Notice of Allowance issued in U.S. Appl. No. 16/931,113, dated May 16, 2023.

\* cited by examiner

CATHODE MATERIAL AND BATTERY

CROSS-REFERENCE TO RELATED APPLICATIONS

This application is a Divisional of U.S. application Ser. No. 16/931,113 filed on Jul. 16, 2020, now U.S. Pat. No. 11,749,803, which is a Continuation of International Application No. PCT/JP2018/043358 filed on Nov. 26, 2018, which claims priority to Japanese Patent Application No. 2018-173451 filed on Sep. 18, 2018, Japanese Patent Application No. 2018-011534 filed on Jan. 26, 2018, and Japanese Patent Application No. 2018-011533 filed on Jan. 26, 2018. The entire disclosures of these applications are incorporated by reference herein.

BACKGROUND

1. Technical Field

The present disclosure relates to a cathode material for a battery and a battery.

2. Description of the Related Art

Patent Literature 1 discloses a battery using, as a solid electrolyte, a halide including indium. Patent Literature 2 discloses an all-solid lithium battery in which a surface of a cathode active material is coated with a lithium ion conductive oxide having substantially no electronic conductivity.

CITATION LIST

Patent Literature

Patent Literature 1: Japanese Patent Application Publication No. 2006-244734
Patent Literature 2: Japanese Patent Publication No. 4982866

Non-Patent Literature

Non-patent Literature 1: Chem. Mater. 2016, 28, 266-273.

SUMMARY

In the prior art, suppression of an increase in a reaction overvoltage of a battery is desired.

The cathode material according to one aspect of the present disclosure comprises:
a cathode active material;
a coating layer which coats at least a part of a surface of the cathode active material and includes a first solid electrolyte material; and
a second solid electrolyte material,
wherein
the first solid electrolyte material includes Li, M, and X;
the first solid electrolyte material does not include sulfur;
M includes at least one element selected from the group consisting of metalloid elements and metal elements other than Li; and
X includes at least one element selected from the group consisting of Cl and Br.

According to the present disclosure, the increase in the reaction overvoltage of the battery can be suppressed.

DETAILED DESCRIPTION OF THE EMBODIMENTS

Hereinafter, embodiments of the present disclosure will be described with reference to the drawings.

First Embodiment

The cathode material in the first embodiment includes a cathode active material, a first solid electrolyte material, and a second solid electrolyte material.

The first solid electrolyte material is located on a surface of the cathode active material to form a coating layer.

The first solid electrolyte material is a material represented by the following composition formula (1):

$$Li_\alpha M_\beta X_\gamma \qquad \text{Formula (1)}$$

where $\alpha$, $\beta$, and $\gamma$ are each independently a value greater than zero.

M includes at least one element selected from the group consisting of metalloid elements and metal elements other than Li.

X includes at least one element selected from the group consisting of Cl and Br.

According to the above configuration, an increase in a reaction overvoltage of a battery can be suppressed.

Patent Literature 1 discloses that, in the all-solid secondary battery including a solid electrolyte consisting of a compound including indium, it is preferable that the cathode active material has an electric potential with regard to Li of not more than 3.9 V on average, and that thereby a film consisting of a decomposition product due to oxidative decomposition of the solid electrolyte is formed to provide a good charge/discharge characteristic. In addition, a general layered transition metal oxide cathode such as $LiCoO_2$ or $LiNi_{0.8}Co_{0.15}Al_{0.05}O_2$ is disclosed as the cathode active material having an electric potential with regard to Li of not more than 3.9 V on average.

On the other hand, as a result of intensive studies by the present inventors, the present inventors found that, in a battery using a halide solid electrolyte including iodine (=I) in a cathode material (namely, one example of the second solid electrolyte material), even if a cathode active material having an electric potential with regard to Li of not more than 3.9 V is used, the halide solid electrolyte is oxidized and decomposed during charge. In addition, the present inventors presumed that there arises a problem that a reaction overvoltage of the battery is increased together with the oxidation and decomposition, and that the reason therefor is an oxidation reaction of iodine included in the halide solid electrolyte. Specifically, in addition to a normal charging reaction in which lithium and electrons are extracted from the cathode active material in the cathode material, a side reaction in which electrons are also extracted from the halide solid electrolyte including iodine in contact with the cathode active material occurs. In other words, an oxidative decomposition layer having poor lithium-ion conductivity is formed between the cathode active material and the halide solid electrolyte, and the oxidative decomposition layer functions as a large interface resistance in the electrode reaction of the cathode. In order to solve this problem, it is necessary to suppress electron transfer to the halide solid electrolyte including iodine to suppress the formation of the oxidative decomposition layer.

Non-patent Literature 1 discloses calculation results regarding electric potential stability of various solid electrolytes such as an oxide solid electrolyte, a sulfide solid electrolyte, and a halide solid electrolyte. With regard to the halide solid electrolyte, it has been disclosed that the electric potential stability thereof varies depending on the anion species forming the halide solid electrolyte. For example, it has been disclosed that a halide solid electrolyte including Br has an electric potential stability of not more than 4.0 V vs. Li.

On the other hand, as a result of intensive studies by the present inventors, the present inventors found that, even if solid electrolytes have an upper limit of the electric potential stability derived from calculation of less than 4.0 V vs. Li, some of the solid electrolytes exhibit the stable charge/discharge characteristic if used for a cathode material. For example, if a halide solid electrolyte which includes bromine and has an upper limit of the electric potential stability of not more than 4.0 V vs. Li is used for the cathode material, the halide solid electrolyte exhibits a good charge/discharge characteristic even if charge is performed at a voltage of not less than 4.0 V vs. Li. On the other hand, the present inventors found that, if a halide solid electrolyte including iodine is used for the cathode material, charge/discharge efficiency is lowered significantly. Although details of the mechanism thereof are not clear, if the halide solid electrolyte including bromine is used for the cathode material, the solid electrolyte is oxidized during the charge in the immediate vicinity where the cathode active material and the solid electrolyte are in contact with each other. However, since the electronic conductivity of the oxidation product is significantly low, the reaction does not proceed continuously into the solid electrolyte. On the other hand, if the halide solid electrolyte including iodine is used for the cathode material, the oxidation product of the solid electrolyte has electronic conductivity. As a result, the reaction is not retained only in the vicinity where the cathode active material and the solid electrolyte are in contact with each other, the reaction proceeds continuously into the solid electrolyte, and the oxidative decomposition layer of the solid electrolyte is formed continuously. As a result, it is conceivable that the reaction overvoltage of the battery is increased. As described above, the battery operation when the solid electrolyte is used for the cathode material cannot be estimated only from the calculation result disclosed in Non-patent Literature 1.

Since a halide solid electrolyte including iodine has poor oxidation stability, the oxidative decomposition occurs continuously during the charge in a battery in which the cathode active material and the halide solid electrolyte including iodine are in contact with each other. On the other hand, the halide solid electrolyte which does not include iodine (namely, one example of the first solid electrolyte material) is excellent in oxidation stability. Even if the halide solid electrolyte which does not include iodine is brought into direct contact with the cathode active material, the oxidative decomposition does not occur, or a reaction does not continue even if the oxidative decomposition occurs. In the configuration according to an embodiment of the present disclosure, the cathode active material and the halide solid electrolyte including iodine are separated by a coating layer including the halide solid electrolyte which does not include iodine, and are not in direct contact with each other. Therefore, according to the above configuration, the oxidation of the halide solid electrolyte including iodine can be suppressed, and the increase in the reaction overvoltage of the battery can be suppressed. In addition, the halide solid electrolyte including iodine is superior in ion conductivity to the halide solid electrolyte which does not include iodine. Therefore, according to the above configuration, an output characteristic of the battery can be further improved, as compared with a case where only the halide solid electrolyte which does not include iodine is used for a cathode layer.

The halide solid electrolytes have high ion conductivity and excellent thermal stability, and do not generate a harmful gas such as hydrogen sulfide. Therefore, by using the halide solid electrolyte, the output characteristic and the thermal stability of the battery can be improved, and the generation of the harmful gas such as hydrogen sulfide can be suppressed.

Patent Literature 2 discloses that a high resistance layer is formed by contact between a sulfide solid electrolyte and a cathode active material that exhibits a redox reaction at an electric potential of not less than 3 V, and that the formation of the high resistance layer can be suppressed by coating a surface of the cathode active material with a lithium ion conductive oxide having no electronic conductivity.

Here, the present inventors found an idea that the high resistance layer would be allowed to be suppressed by coating the cathode active material with a lithium ion conductive halide having no electronic conductivity. Furthermore, by coating the cathode active material with a halide solid electrolyte that is superior in lithium ion conductivity to an oxide solid electrolyte, Li transfer resistance from the solid electrolyte to the cathode active material is allowed to be suppressed.

As already described, Patent Literature 1 discloses that, in the all-solid secondary battery including a solid electrolyte consisting of a compound including indium, it is preferable that the cathode active material has an electric potential with regard to Li of not more than 3.9 V on average, and that thereby a film consisting of a decomposition product due to oxidative decomposition is formed to provide a good charge/discharge characteristic. However, detailed mechanism of the oxidative decomposition is not clarified.

As a result of intensive studies by the present inventors, the present inventors found that, in a case where iodine is included in the halide solid electrolyte, the oxidation reaction proceeds to form a resistance layer even if a cathode active material having an electric potential with regard to Li of not more than 3.9 V on average is used. The present inventors presumed that an iodine-containing halide solid electrolyte in contact with the cathode active material is oxidized as a side reaction during the charge to form a resistance layer having poor ion conductivity.

In an all-solid battery that uses a sulfide solid electrolyte (one example of the second solid electrolyte material) for the cathode, by coating the cathode active material with a halide solid electrolyte that does not include iodine (one example of the first solid electrolyte material), the formation of the high resistance layer due to the contact between the cathode active material and the sulfide solid electrolyte is suppressed, and a low resistance cathode active material/sulfide solid electrolyte interface can be formed due to high ion conductivity of the halide solid electrolyte.

In a configuration according to another embodiment of the present disclosure, electron transfer to the sulfide solid electrolyte is suppressed by the iodine-free halide solid electrolyte included in the coating layer. As a result, a side reaction of the sulfide solid electrolyte does not occur, and the charge/discharge efficiency is improved. Further, since no side reaction occurs, the formation of the oxide layer is suppressed, and interfacial resistance of the electrode reaction can be lowered.

The term "metalloid elements" are B, Si, Ge, As, Sb, and Te.

The term "metal elements" are all elements included in Groups 1 to 12 of the periodic table except for hydrogen, and all elements included in Groups 13 to 16 of the periodic table except for B, Si, Ge, As, Sb, Te, C, N, P, O, S, and Se. In other words, the metal element becomes a cation if the metal element forms an inorganic compound with a halogen compound.

The halide solid electrolyte including at least one element selected from the group consisting of metalloid elements and metal elements other than Li has higher ion conductivity than a halide solid electrolyte such as LiI composed only of Li and a halogen element. As a result, in a case where the halide solid electrolyte including the at least one element selected from the group consisting of metalloid elements and metal elements other than Li is used for the battery, the output characteristic of the battery can be improved.

In the composition formula (1), M may include Y (=yttrium).

In other words, the first solid electrolyte material may include Y as a metal element.

According to the above configuration, the ion conductivity of the first solid electrolyte material can be further improved. Thereby, the charge/discharge characteristic of the battery can be further improved.

The first solid electrolyte material including Y may be, for example, a compound represented by a composition formula of $Li_aMe_bY_cX_6$. Here, $a+mb+3c=6$ and $c>0$ are satisfied. Me is at least one selected from the group consisting of metalloid elements and metal elements other than Li and Y. The value of m is a valence of Me.

As Me, at least one element selected from the group consisting of Mg, Ca, Sr, Ba, Zn, Sc, Al, Ga, Bi, Zr, Hf, Ti, Sn, Ta, and Nb may be used.

According to the above configuration, the ion conductivity of the first solid electrolyte material can be further improved.

In the composition formula (1), $2.5 \leq \alpha \leq 3$, $1 \leq \beta \leq 1.1$, and $\gamma=6$ may be satisfied.

According to the above configuration, the ion conductivity of the first solid electrolyte material can be further improved. Thereby, the charge/discharge characteristic of the battery can be further improved.

The first solid electrolyte material may be a material represented by the following composition formula (A1):

$$Li_{6-3d}Y_dX_6 \quad \text{Formula (A1)}$$

where, in the composition formula (A1), X is at least one element selected from the group consisting of Cl and Br. In the composition formula (A1), $0<d<2$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A2):

$$Li_3YX_6 \quad \text{Formula (A2)}$$

where, in the composition formula (A2), X is at least one element selected from the group consisting of Cl and Br.

According to the above configuration, the ion conductivity of the first solid electrolyte material can be further improved. Thereby, the charge/discharge efficiency of the battery can be further improved.

The first solid electrolyte material may be a material represented by the following composition formula (A3):

$$Li_{3-3\delta}Y_{1+\delta}Cl_6 \quad \text{Formula (A3)}$$

where, in the composition formula (A3), $0<\delta\leq0.15$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A4):

$$Li_{3-3\delta}Y_{1+\delta}Br_6 \quad \text{Formula (A4)}$$

where, in the composition formula (A4), $0<\delta\leq0.25$ is satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A5):

$$Li_{3-3\delta+a}Y_{1+\delta-a}Me_aCl_{6-x}Br_x \quad \text{Formula (A5)}$$

where, in the composition formula (A5), Me is one or more kinds of elements selected from the group consisting of Mg, Ca, Sr, Ba, and Zn.

In the composition formula (A5), $-1<\delta<2$, $0<a<3$, $0<(3-3\delta+a)$, $0<(1+\delta-a)$, and $0\leq x\leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A6):

$$Li_{3-3\delta}Y_{1+\delta-a}Me_aCl_{6-x}Br_x \quad \text{Formula (A6)}$$

where, in the composition formula (A6), Me is one or more kinds of elements selected from the group consisting of Al, Sc, Ga, and Bi.

In the composition formula (A6), $-1<\delta<1$, $0<a<2$, $0<(1+\delta-a)$, and $0\leq x\leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A7):

$$Li_{3-3\delta-a}Y_{1+\delta-a}Me_aCl_{6-x}Br_x \quad \text{Formula (A7)}$$

where, in the composition formula (A7), Me is one or more kinds of elements selected from the group consisting of Zr, Hf, and Ti.

In the composition formula (A7), $-1<\delta<1$, $0<a<1.5$, $0<(3-3\delta-a)$, $0<(1+\delta-a)$, and $0\leq x\leq 6$ are satisfied.

According to the above configuration, the ion conductivity of the first solid electrolyte material can be further improved. Thereby, the charge/discharge efficiency of the battery can be further improved.

The first solid electrolyte material may be a material represented by the following composition formula (A8):

$$Li_{3-3\delta-2a}Y_{1+\delta-a}Me_aCl_{6-x}Br_x \quad \text{Formula (A8)}$$

where, in the compositional formula (A8), Me is one or more kinds of elements selected from the group consisting of Ta and Nb.

In the composition formula (A8), $-1<\delta<1$, $0<a<1.2$, $0<(3-3\delta-2a)$, $0<(1+\delta-a)$, and $0\leq x\leq 6$ are satisfied.

According to the above configuration, the ion conductivity of the first solid electrolyte material can be further improved. Thereby, the charge/discharge efficiency of the battery can be further improved.

As the first solid electrolyte material, for example, $Li_3YX_6$, $Li_2MgX_4$, $Li_2FeX_4$, $Li(Al, Ga, In)X_4$, or $Li_3(Al, Ga, In)X_6$ may be used. Here, X includes at least one element selected from the group consisting of Cl and Br.

The second solid electrolyte material includes a material having high ion conductivity. For example, a halide solid electrolyte including iodine is used as the second solid electrolyte material. For example, as the halide solid electrolyte including iodine, a compound represented by the following composition formula (2) may be used:

$$Li_{\alpha'}M'_{\beta'}X'_{\gamma'} \quad \text{Formula (2)}$$

where α', β', and γ' are each independently a value greater than zero.

M' includes at least one element selected from the group consisting of metalloid elements and metal elements other than Li.

X' includes I and at least one element selected from the group consisting of Cl and Br.

According to the above configuration, the ion conductivity of the second solid electrolyte material can be further improved. Thereby, the charge/discharge efficiency of the battery can be further improved.

In the composition formula (2), M' may include Y.

In other words, the second solid electrolyte material may include Y as a metal element.

According to the above configuration, the ion conductivity of the second solid electrolyte material can be further improved. Thereby, the charge/discharge characteristic of the battery can be further improved.

In the composition formula (2), X' may include Br (=bromine) and Cl (=chlorine).

According to the above configuration, the ion conductivity of the second solid electrolyte material can be further improved. Thereby, the charge/discharge characteristic of the battery can be further improved.

The second solid electrolyte material may be a material represented by the following composition formula (B1):

$$Li_{6-3d}Y_dX_6 \quad \text{Formula (B1)}$$

where, in the composition formula (B1), X is one or more kinds of halogen elements including at least I. In addition, in the composition formula (B1), 0<d<2 is satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B2):

$$Li_3YX_6 \quad \text{Formula (B2)}$$

where, in the composition formula (B2), X is one or more kinds of halogen elements including at least I.

According to the above configuration, the ion conductivity of the second solid electrolyte material can be further improved. Thereby, the charge/discharge efficiency of the battery can be further improved.

The second solid electrolyte material may be a material represented by the following composition formula (B3):

$$Li_{3-3\delta+a}Y_{1+\delta-a}Me_aCl_{6-x-y}Br_xI_y \quad \text{Formula (B3)}$$

where, in the composition formula (B3), Me is one or more kinds of elements selected from the group consisting of Mg, Ca, Sr, Ba, and Zn.

In the composition formula (B3), −1<δ<2, 0<a<3, 0<(3−3δ+a), 0<(1+δ−a), 0≤x<6, 0<y≤6, and (x+y)<6 are satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B4):

$$Li_{3-3\delta}Y_{1+\delta-a}Me_aCl_{6-x-y}Br_xI_y \quad \text{Formula (B4)}$$

where, in the compositional formula (B4), Me is one or more kinds of elements selected from the group consisting of Al, Sc, Ga, and Bi.

In the composition formula (B4), −1<δ<1, 0<a<2, 0<(1+δ−a), 0≤x<6, 0<y≤6, and (x+y)<6 are satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B5):

$$Li_{3-3\delta-a}Y_{1+\delta-a}Me_aCl_{6-x-y}Br_xI_y \quad \text{Formula (B5)}$$

where, in the composition formula (B5), Me is one or more kinds of elements selected from the group consisting of Zr, Hf, and Ti.

In the composition formula (B5), −1<δ<1, 0<a<1.5, 0<(3−3δ−a), 0<(1+δ−a), 0≤x<6, 0<y≤6, and (x+y)<6 are satisfied.

According to the above configuration, the ion conductivity of the second solid electrolyte material can be further improved. Thereby, the charge/discharge efficiency of the battery can be further improved.

The second solid electrolyte material may be a material represented by the following composition formula (B6):

$$Li_{3-3\delta-2a}Y_{1+\delta-a}Me_aCl_{6-x-y}Br_xI_y \quad \text{Formula (B6)}$$

where, in the composition formula (B6), Me is one or more kinds of elements selected from the group consisting of Ta and Nb.

In the composition formula (B6), −1<δ<1, 0<a<1.2, 0<(3−3δ−2a), 0<(1+δ−a), 0≤x<6, 0<y≤6, and (x+y)<6 are satisfied.

According to the above configuration, the ion conductivity of the second solid electrolyte material can be further improved. Thereby, the charge/discharge efficiency of the battery can be further improved.

As the second solid electrolyte material, for example, $Li_3YX_6$, $Li_2MgX_4$, $Li_2FeX_4$, $Li(Al, Ga, In)X_4$, or $Li_3(Al, Ga, In)X_6$ may be used. Here, X includes I and at least one element selected from the group consisting of Cl and Br.

A sulfide solid electrolyte may also be used as the second solid electrolyte material. As the sulfide solid electrolyte, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ may be used. In addition, LiX, $Li_2O$, $MO_q$, or $Li_pMO_q$ may be added thereto. Here, X is one or more kinds of elements selected from the group consisting of F, Cl, Br, and I. In addition, M is one or more kinds of elements selected from the group consisting of P, Si, Ge, B, Al, Ga, In, Fe, and Zn. In addition, p and q are each independently a natural number.

In the first embodiment, the second solid electrolyte material may be a sulfide solid electrolyte. For example, the sulfide solid electrolyte may include lithium sulfide and phosphorus sulfide. For example, the sulfide solid electrolyte may be $Li_2S$—$P_2S_5$.

Li$_2$S—P$_2$S$_5$ has high ion conductivity and is stable against oxidation and reduction. Therefore, by using Li$_2$S—P$_2$S$_5$, the charge/discharge efficiency of the battery can be further improved.

The cathode active material includes a material having a property of occluding and releasing metal ions (for example, lithium ions). Examples of the cathode active material include a lithium-containing transition metal oxide (e.g., Li(NiCoAl)O$_2$, Li(NiCoMn)O$_2$, or LiCoO$_2$), a transition metal fluoride, a polyanion material, a fluorinated polyanion material, a transition metal sulfide, a transition metal oxysulfide, and a transition metal oxynitride. In particular, if a lithium-containing transition metal oxide is used as the cathode active material, cost reduction can be performed and an average discharge voltage can be increased.

In the first embodiment, the cathode active material may be a lithium nickel-cobalt-manganese oxide. For example, the cathode active material may be Li(NiCoMn)O$_2$.

According to the above configuration, an energy density and the charge/discharge efficiency of the battery can be further increased.

As the first solid electrolyte material included in the coating layer, a material having low electron conductivity and resistance against oxidation may be used. For example, a halide solid electrolyte which does not include iodine may be used as the first solid electrolyte material.

A halide solid electrolyte which does not include iodine has high ion conductivity and high potential stability. As a result, by using the halide solid electrolyte that does not include iodine, the charge/discharge efficiency of the battery can be further increased, and the increase in the reaction overvoltage of the battery can be further suppressed.

In the first embodiment, the first solid electrolyte material may be Li$_{2.7}$Y$_{1.1}$Cl$_6$, Li$_3$YBr$_6$, or Li$_{2.5}$Y$_{0.5}$Zr$_{0.5}$Cl$_6$.

According to the above configuration, the charge/discharge efficiency of the battery can be further increased, and the increase in the reaction overvoltage of the battery can be further suppressed.

Figure 1:
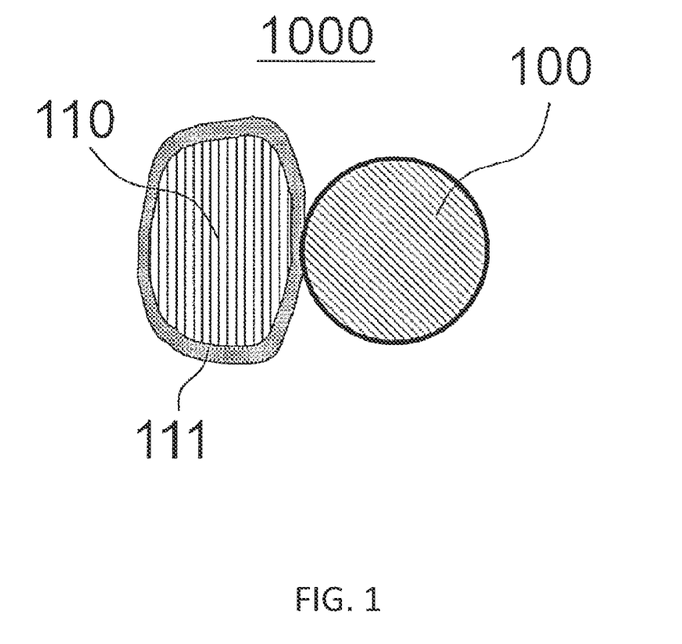
FIG. 1 is a cross-sectional view showing a schematic configuration of a cathode material in a first embodiment.

FIG. 1 is a cross-sectional view showing a schematic configuration of a cathode material 1000 in the first embodiment.

The cathode material 1000 according to the first embodiment includes second solid electrolyte particles 100, cathode active material particles 110, and a coating layer 111.

The cathode active material particles 110 and the second solid electrolyte particles 100 are separated by the coating layer 111 and are not in direct contact with each other.

The coating layer 111 is a layer including the first solid electrolyte material. In other words, the coating layer 111 is provided on the surface of the cathode active material particles 110.

The thickness of the coating layer 111 may be not less than 1 nm and not more than 100 nm.

If the thickness of the coating layer 111 is not less than 1 nm, the direct contact between the cathode active material particles 110 and the second solid electrolyte particles 100 can be suppressed, and a side reaction of the second solid electrolyte material can be suppressed. As a result, the charge/discharge efficiency can be improved.

In addition, the thickness of the coating layer 111 does not excessively increase since the thickness of the coating layer 111 is not more than 100 nm. As a result, the internal resistance of the battery can be sufficiently lowered. As a result, the energy density of the battery can be increased.

In addition, the coating layer 111 may uniformly coat the cathode active material particles 110. The direct contact between the cathode active material particles 110 and the second solid electrolyte particles 100 can be suppressed, and the side reaction of the second solid electrolyte material can be suppressed. As a result, the charge/discharge characteristic of the battery can be further improved, and the increase in the reaction overvoltage of the battery can be suppressed.

Alternatively, the coating layer 111 may coat a part of the cathode active material particles 110. The plurality of the cathode active material particles 110 are in direct contact with each other through the part that does not have the coating layer 111 to improve the electron conductivity between the cathode active material particles 110. As a result, the battery is allowed to operate at a high output.

In addition, the shape of the second solid electrolyte material in the first embodiment is not particularly limited, and may be, for example, a needle shape, a spherical shape, or an elliptical spherical shape. For example, the shape of the second solid electrolyte material may be particles.

For example, if the shape of the second solid electrolyte material in the first embodiment is particulate (for example, spherical), the median diameter may be not more than 100 µm. If the median diameter is not more than 100 µm, a good dispersion state of the cathode active material particles 110 and the second solid electrolyte particles 100 can be formed in the cathode material. As a result, the charge/discharge characteristic is improved. In the first embodiment, the median diameter may be not more than 10 µm.

According to the above configuration, in the cathode material, the good dispersion state of the cathode active material particles 110 and the second solid electrolyte particles 100 can be formed.

In the first embodiment, the second solid electrolyte particles 100 may be smaller than the median diameter of the cathode active material particles 110.

According to the above configuration, a better dispersion state of the second solid electrolyte particles 100 and the cathode active material particles 110 can be formed in the electrode.

The median diameter of the cathode active material particles 110 may be not less than 0.1 µm and not more than 100 µm.

If the median diameter of the cathode active material particles 110 is not less than 0.1 µm, in the cathode material 1000, the good dispersion state of the cathode active material particles 110 and the second solid electrolyte particles 100 can be formed. As a result, the charge/discharge characteristic of the battery is improved.

In addition, if the median diameter of the cathode active material particles 110 is not more than 100 µm, lithium diffusion in the cathode active material particles 110 is accelerated. As a result, the battery can operate at a high output.

The median diameter of the cathode active material particles 110 may be larger than the median diameter of the second solid electrolyte particles 100. Thereby, a good dispersion state of the cathode active material particles 110 and the second solid electrolyte particles 100 can be formed.

In the cathode material 1000 according to the first embodiment, the second solid electrolyte particles 100 and the coating layer 111 may be in contact with each other as shown in FIG. 1. In this case, the coating layer 111 and the cathode active material particles 110 are in contact with each other.

In addition, the cathode material 1000 in the first embodiment may include a plurality of the second solid electrolyte particles 100 and a plurality of the cathode active material particles 110.

In addition, the content of the second solid electrolyte particles 100 and the content of the cathode active material particles 110 in the cathode material 1000 in the first embodiment may be the same as or different from each other.

<Manufacturing Method of First Solid Electrolyte Material and Second Solid Electrolyte Material>

The first solid electrolyte material and the second solid electrolyte material in the first embodiment may be manufactured by the following method, for example.

Binary halide raw material powders are prepared so as to provide a blending ratio of a target composition. For example, if $Li_3YCl_6$ is produced, LiCl and $YCl_3$ are prepared at a molar ratio of 3:1.

At this time, "M", "Me", and "X" in the above composition formula can be determined by selecting the kinds of the raw material powders. In addition, by adjusting the raw materials, the blending ratio, and the synthesis process, the values "α", "β", "γ", "d", "δ", "a", "x", and "y" can be adjusted.

The raw material powders are mixed well, and then the raw material powders are mixed and ground to react using a mechanochemical milling method. Alternatively, the raw material powders may be mixed well, and then sintered in a vacuum.

Thereby, the solid electrolyte material including the crystal phase described above is provided.

In addition, the structure (namely, the crystal structure) of the crystal phase in the solid electrolyte material can be determined by adjusting the reaction method and reaction conditions of the raw material powders.

Second Embodiment

Hereinafter, the second embodiment will be described. The description which has been set forth in the above-described first embodiment is omitted as appropriate.

Figure 2:
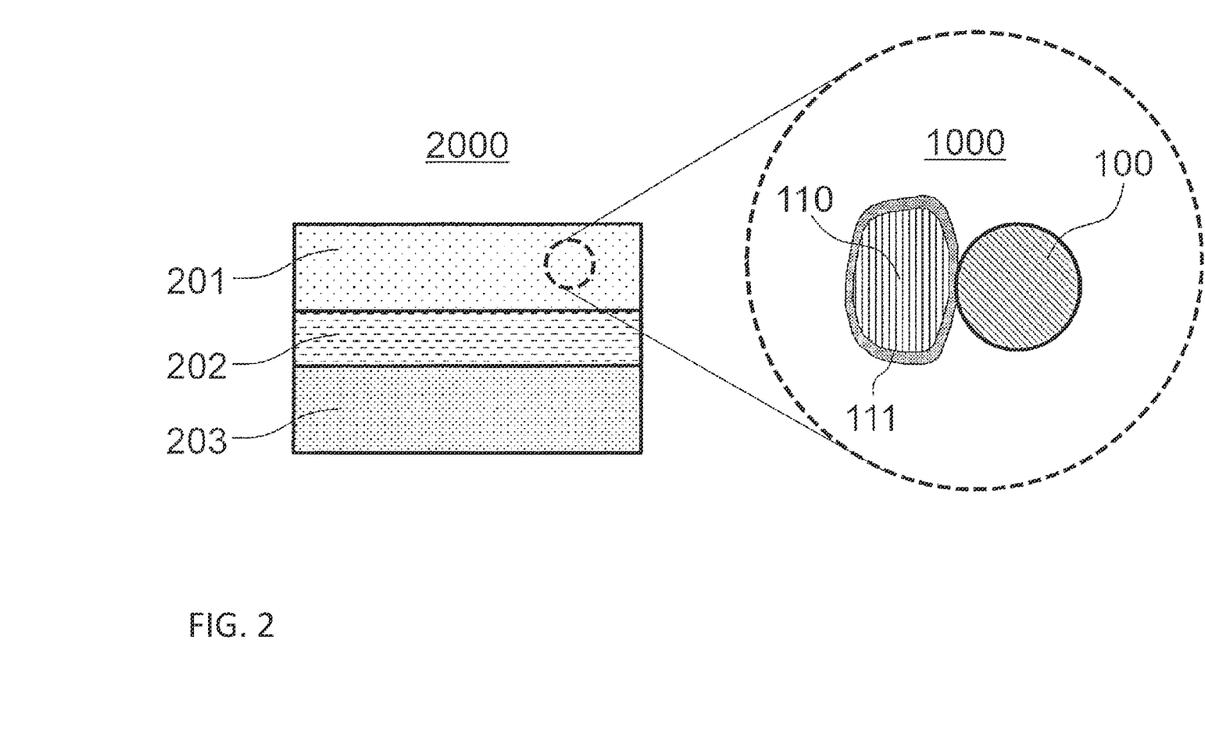
FIG. 2 is a cross-sectional view showing a schematic configuration of a battery in a second embodiment.

FIG. 2 is a cross-sectional view showing a schematic configuration of a battery 2000 in the second embodiment.

The battery 2000 in the second embodiment comprises a cathode 201, an electrolyte layer 202, and an anode 203.

The cathode 201 includes the cathode material (for example, the cathode material 1000) in the first embodiment.

The electrolyte layer 202 is disposed between the cathode 201 and the anode 203.

According to the above configuration, the increase in the reaction overvoltage of the battery can be suppressed.

With regard to a volume ratio "v:100-v" of the cathode active material particles 110 and the second solid electrolyte particles 100 included in the cathode 201, 30≤v≤95 may be satisfied. If 30≤v, a sufficient battery energy density can be secured. In addition, if v≤95, the operation at a high output can be realized.

The thickness of the cathode 201 may be not less than 10 μm and not more than 500 μm. In addition, if the thickness of the cathode 201 is not less than 10 μm, a sufficient battery energy density can be secured. In addition, if the thickness of the cathode 201 is not more than 500 μm, the operation at a high output can be realized.

The electrolyte layer 202 is a layer including an electrolyte material. The electrolyte material is, for example, a solid electrolyte material (namely, a third solid electrolyte material). In other words, the electrolyte layer 202 may be a solid electrolyte layer.

As the third solid electrolyte material included in the electrolyte layer 202, a halide solid electrolyte, a sulfide solid electrolyte, an oxide solid electrolyte, a polymer solid electrolyte, or a complex hydride solid electrolyte may be used.

As the halide solid electrolyte of the third solid electrolyte material, the same halide solid electrolyte as the first solid electrolyte material and/or the second solid electrolyte material in the first embodiment may be used. In other words, the electrolyte layer 202 may include the same halide solid electrolyte as the first solid electrolyte material and/or the second solid electrolyte material in the first embodiment.

According to the above configuration, the output density and the charge/discharge characteristic of the battery can be further improved.

Further, the third solid electrolyte material included in the electrolyte layer 202 may be a halide solid electrolyte different from the first solid electrolyte material and the second solid electrolyte material in the first embodiment. In other words, the electrolyte layer 202 may include a halide solid electrolyte different from the first solid electrolyte material and the second solid electrolyte material in the first embodiment.

According to the above configuration, the charge/discharge characteristic of the battery can be further improved.

As the sulfide solid electrolyte of the third solid electrolyte material, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ can be used. In addition, LiX, $Li_2O$, $MO_q$, or $Li_pMO_q$ may be added thereto. Here, X is one or more kinds of elements selected from the group consisting of F, Cl, Br, and I. M is one or more kinds of elements selected from the group consisting of P, Si, Ge, B, Al, Ga, In, Fe, and Zn. In addition, p and q are each independently a natural number.

Alternatively, the same sulfide solid electrolyte as the second solid electrolyte material in the first embodiment may be used as the sulfide solid electrolyte of the third solid electrolyte material. In other words, the electrolyte layer 202 may include the same sulfide solid electrolyte as the second solid electrolyte material in the first embodiment.

According to the above configuration, since the sulfide solid electrolyte excellent in reduction stability is included, a low potential anode material such as graphite or metallic lithium can be used, and the energy density of the battery can be improved. In addition, according to the configuration in which the electrolyte layer 202 includes the same sulfide solid electrolyte as the second solid electrolyte material in the first embodiment, the charge/discharge characteristic of the battery can be improved.

As the oxide solid electrolyte of the third solid electrolyte material, for example, a NASICON solid electrolyte such as $LiTi_2(PO_4)_3$ and the element substitution products thereof, a $(LaLi)TiO_3$ perovskite solid electrolyte, a LISICON solid electrolyte such as $Li_{14}ZnGe_4O_{16}$, $Li_4SiO_4$, $LiGeO_4$ and the element substitution products thereof, a garnet solid electrolyte such as $Li_7La_3Zr_2O_{12}$ and the element substitution products thereof, $Li_3N$ and the H substitution products thereof, $Li_3PO_4$ and the N substitution products thereof, glass to which $Li_2SO_4$ or $Li_2CO_3$ has been added using a Li—Bi—O compound such as $LiBO_2$ or $Li_3BO_3$ as a base, or glass ceramics may be used.

As the polymer solid electrolyte of the third solid electrolyte material, for example, a compound of a polymer compound and a lithium salt can be used. The polymer compound may have an ethylene oxide structure. Due to the ethylene oxide structure, a large amount of lithium salt can be included, and the ion conductivity can be further increased. As the lithium salt, $LiPF_6$, $LiBF_4$, $LiSbF_6$, $LiAsF_6$, $LiSO_3CF_3$, $LiN(SO_2CF_3)_2$, $LiN(SO_2C_2F_5)_2$, LiN $(SO_2CF_3)(SO_2C_4F_9)$, or $LiC(SO_2CF_3)_3$ may be used. As the lithium salt, one lithium salt selected from these may be used alone. Alternatively, a mixture of two or more lithium salts selected from these may be used as the lithium salt.

As the complex hydride solid electrolyte of the third solid electrolyte material, for example, $LiBH_4$—LiI or $LiBH_4$—$P_2S_5$ may be used.

The solid electrolyte layer may include a third solid electrolyte material as a main component. In other words, the solid electrolyte layer may include the third solid electrolyte material, for example, at a weight ratio of not less than 50% (namely, 50% by weight or more) with respect to the entire solid electrolyte layer.

According to the above configuration, the charge/discharge characteristic of the battery can be further improved.

In addition, the solid electrolyte layer may include the third solid electrolyte material, for example, at a weight ratio of not less than 70% (namely, 70% by weight or more) with respect to the entire solid electrolyte layer.

According to the above configuration, the charge/discharge characteristic of the battery can be further improved.

The solid electrolyte layer includes the third solid electrolyte material as the main component thereof, and the solid electrolyte layer may further include inevitable impurities. The solid electrolyte layer may include the starting materials used for the synthesis of the third solid electrolyte material. The solid electrolyte layer may include by-products or decomposition products generated when the solid electrolyte material is synthesized.

In addition, the solid electrolyte layer may include the third solid electrolyte material, for example, at a weight ratio of 100% (namely, 100% by weight) with respect to the entire electrolyte layer, except for the inevitable impurities.

According to the above configuration, the charge/discharge characteristic of the battery can be further improved.

The solid electrolyte layer may be comprised only from the third solid electrolyte material.

The solid electrolyte layer may include two or more kinds of the materials listed as the third solid electrolyte material. For example, the solid electrolyte layer may include the halide solid electrolyte and the sulfide solid electrolyte.

The thickness of the electrolyte layer 202 may be not less than 1 µm and not more than 300 µm. If the thickness of the electrolyte layer 202 is not less than 1 µm, the cathode 201 and the anode 203 are easily separated. In addition, if the thickness of the electrolyte layer 202 is not more than 300 µm, the operation at a high output can be realized.

The anode 203 includes a material having a property of occluding and releasing metal ions (for example, lithium ions). The anode 203 includes, for example, an anode active material.

As the anode active material, a metal material, a carbon material, an oxide, a nitride, a tin compound, or a silicon compound may be used. The metal material may be a single metal. Alternatively, the metal material may be an alloy. Examples of the metal material include a lithium metal and a lithium alloy. Examples of the carbon material include natural graphite, coke, graphitized carbon, carbon fiber, spherical carbon, artificial graphite, and amorphous carbon. From the viewpoint of capacity density, silicon (Si), tin (Sn), a silicon compound, or a tin compound may be used.

The anode 203 may include a solid electrolyte material. As the solid electrolyte material, the solid electrolyte material exemplified as the material forming the electrolyte layer 202 may be used. According to the above configuration, the lithium ion conductivity inside the anode 203 is increased, and the operation at a high output can be realized.

The median diameter of the anode active material particles may be not less than 0.1 µm and not more than 100 µm. If the median diameter of the anode active material particles is not less than 0.1 µm, a good dispersion state of the anode active material particles and the solid electrolyte material can be formed in the anode. Thereby, the charge/discharge characteristic of the battery is improved. In addition, if the median diameter of the anode active material particles is not more than 100 µm, lithium diffusion in the anode active material particles is accelerated. As a result, the battery can operate at a high output.

The median diameter of the anode active material particles may be larger than the median diameter of the solid electrolyte material. Thereby, a good dispersion state of the anode active material particles and the solid electrolyte material can be formed.

With regard to a volume ratio "v:100−v" of the anode active material particles and the solid electrolyte material included in the anode 203, 30≤v≤95 may be satisfied. If 30≤v, a sufficient battery energy density can be secured. In addition, if v≤95, the operation at a high output can be realized.

The thickness of the anode 203 may be not less than 10 µm and not more than 500 µm. If the thickness of the anode is not less than 10 µm, a sufficient battery energy density can be secured. In addition, if the thickness of the anode is not more than 500 µm, the operation at a high output can be realized.

At least one of the cathode 201, the electrolyte layer 202, and the anode 203 may include a binder for the purpose of improving the adhesion between the particles. The binder is used to improve the binding property of the material forming the electrode. An example of the binder is poly(vinylidene fluoride), polytetrafluoroethylene, polyethylene, polypropylene, aramid resin, polyamide, polyimide, polyamideimide, polyacrylonitrile, polyacrylic acid, methyl polyacrylate ester, ethyl polyacrylate ester, hexyl polyacrylate ester, polymethacrylic acid, methyl polymethacrylate ester, ethyl polymethacrylate ester, hexyl polymethacrylate ester, polyvinyl acetate, polyvinylpyrrolidone, polyether, polyethersulfone, hexafluoropolypropylene, styrene butadiene rubber, or carboxymethylcellulose. As the binder, a copolymer of two or more kinds of materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used. In addition, two or more kinds of materials selected from these may be mixed and used as a binder.

In addition, at least one of the cathode 201 and the anode 203 may include a conductive assistant for the purpose of improving electron conductivity. Examples of the conductive assistant include graphite such as natural graphite or artificial graphite; carbon black such as acetylene black or ketjen black; a conductive fiber such as a carbon fiber or a metal fiber; carbon fluoride; metal powder such as aluminum; conductive whiskers such as zinc oxide or potassium titanate; a conductive metal oxide such as titanium oxide; or a conductive polymer compound such as polyaniline, polypyrrole, or polythiophene. Cost reduction can be achieved by using a carbon conductive assistant.

An example of the shape of the battery in the second embodiment may be a coin, a cylinder, a prism, a sheet, a button, a flat type, or a stacking structure.

EXAMPLES

Hereinafter, details of the present disclosure will be described with reference to inventive examples and comparative examples.

Inventive Example 1

[Production of Second Solid Electrolyte Material]

In an argon glove box with a dew point of −60° C. or less, raw material powders LiBr, LiCl, LiI, YCl$_3$, and YBr$_3$ were prepared at a molar ratio of LiBr:LiCl:LiI:YCl$_3$:YBr$_3$=1:1:4:1:1. Subsequently, milling processing was performed at 600 rpm for 25 hours using a planetary ball mill (manufactured by Fritsch, type P-7) to provide a powder of the second solid electrolyte material Li$_3$YBr$_2$Cl$_2$I$_2$.

[Production of Cathode Active Material Coating Layer]

In an argon glove box with a dew point of −60° C. or less, raw material powders LiCl and YCl$_3$ were prepared at a molar ratio of LiCl:YCl$_3$=2.7:1.1. Subsequently, milling processing was performed at 600 rpm for 25 hours using a planetary ball mill (manufactured by Fritsch, type P-5) to provide a powder of the first solid electrolyte material Li$_{2.7}$Y$_{1.1}$Cl$_6$. The material of the coating layer is a first solid electrolyte material.

Mixing with an agate mortar was used to form a Li$_{2.7}$Y$_{1.1}$Cl$_6$ coating layer on the cathode active material Li(NiCoMn)O$_2$ (hereinafter, referred to as NCM). The first solid electrolyte material (Li$_{2.7}$Y$_{1.1}$Cl$_6$) and the cathode active material (NCM) were prepared at a weight ratio of 1:10 in an argon glove box. By mixing these with an agate mortar, the coated cathode active material of the inventive example 1 in which the coating layer was formed on the surface of each of the particles was provided.

[Production of Cathode Material]

In the argon glove box, the second solid electrolyte material of the inventive example 1 and the coated cathode active material of the inventive example 1 were prepared at a weight ratio of 23:77. By mixing these in an agate mortar, the cathode material of the inventive example 1 was produced.

Inventive Example 2

[Production of Cathode Active Material Coating Layer]

In an argon glove box with a dew point of −60° C. or less, raw material powders LiBr and YBr$_3$ were prepared at a molar ratio of LiBr:YBr$_3$=3:1. Subsequently, milling processing was performed at 600 rpm for 25 hours using a planetary ball mill (manufactured by Fritsch, type P-7) to provide a powder of the first solid electrolyte material Li$_3$YBr$_6$.

The same steps as those of the inventive example 1 were performed to provide the cathode material of the inventive example 2, except for the production of the cathode active material coating layer.

Inventive Example 3

[Production of Cathode Active Material Coating Layer]

In an argon glove box with a dew point of −60° C. or less, raw material powders LiCl, YCl$_3$, and ZrCl$_4$ were prepared at a molar ratio of LiCl:YCl$_3$:ZrCl$_4$=5:1:1. Subsequently, milling processing was performed at 600 rpm for 25 hours using a planetary ball mill (manufactured by Fritsch, type P-7) to provide a powder of the first solid electrolyte material Li$_{2.5}$Y$_{0.5}$Zr$_{0.5}$Cl$_6$.

The same steps as those of the inventive example 1 were performed to provide the cathode material of the inventive example 3, except for the production of the cathode active material coating layer.

Comparative Example 1

The same steps as those of the inventive example 1 were performed to provide the cathode material of the comparative example 1, except that the cathode active material coating layer was not produced and that NCM having a surface on which the coating layer was not formed was used.

[Production of Sulfide Solid Electrolyte]

In an argon glove box with a dew point of −60° C. or less, Li$_2$S and P$_2$S$_5$ were prepared at a molar ratio of Li$_2$S:P$_2$S$_5$=75:25. These were ground and mixed in a mortar. Then, milling processing was performed at 510 rpm for 10 hours using a planetary ball mill (manufactured by Fritsch, type P-7) to provide a glassy solid electrolyte. The glassy solid electrolyte was heat-treated at 270° C. for two hours in an inert atmosphere. In this way, Li$_2$S—P$_2$S$_5$, which was a glass ceramic solid electrolyte, was provided.

[Production of Battery]

The following steps were performed, using each of the cathode materials of the inventive examples 1 to 3 and the comparative example 1 and the glass ceramic Li$_2$S—P$_2$S$_5$.

First, in an insulating outer cylinder, 80 mg of Li$_2$S—P$_2$S$_5$ and 10 mg of the cathode material were stacked in this order. This was pressure-molded at a pressure of 360 MPa to provide a cathode and a solid electrolyte layer.

Next, a metal In (thickness: 200 μm) was stacked on the cathode to form a cathode current collector.

Next, a metal In (thickness 200 μm), a metal Li (thickness 300 μm), and a metal In (thickness 200 μm) were stacked in this order on the surface of the solid electrolyte layer opposite to the other surface which was in contact with the cathode. This was pressure-molded at a pressure of 80 MPa to produce a stacking structure composed of the cathode, the solid electrolyte layer, and an anode.

Next, stainless steel current collectors were placed on the upper and lower parts of the stacking structure, and current collector leads were attached to the current collectors.

Finally, an insulating ferrule was used to block and seal the inside of the insulating outer cylinder from the outside atmosphere to produce a battery.

In this way, the batteries of the inventive examples 1 to 3 and the comparative example 1 were produced.

[Charge Test]

Using each of the batteries of the inventive examples 1 to 3 and the comparative example 1, a charge test was performed under the following conditions.

The battery was placed in a constant temperature chamber at 25° C.

The battery was charged with a constant current at a current value of 70 μA at a 0.05 C rate (20 hour rate) with respect to the theoretical capacity of the battery. The charge was terminated at a voltage of 3.7V.

As described above, the increase in voltage from an OCV voltage (i.e., 3.084 V) at the capacity of 50 mAh/g (converted to the weight of the cathode active material) of each of the batteries of the inventive examples 1 to 3 and the comparative example 1 was defined as an overvoltage. The results are shown in Table 1 below.

TABLE 1

| | First solid electrolyte material (coating material) | Second solid electrolyte material | Overvoltage during charge* |
|---|---|---|---|
| Inventive Example 1 | $Li_{2.7}Y_{1.1}Cl_6$ | $Li_3YBr_2Cl_2I_2$ | 44 mV |
| Inventive Example 2 | $Li_3YBr_6$ | $Li_3YBr_2Cl_2I_2$ | 17 mV |
| Inventive Example 3 | $Li_{2.5}Y_{0.5}Zr_{0.5}Cl_6$ | $Li_3YBr_2Cl_2I_2$ | 43 mV |
| Comparative Example 1 | None | $Li_3YBr_2Cl_2I_2$ | 213 mV |

*Increase in voltage from an OCV voltage (3.084 V) at the charge capacity of 50 mAh/g.

Discussion

From the results of the inventive example 1 and the comparative example 1 shown in Table 1, in the battery using the halide solid electrolyte including iodine (one example of the second solid electrolyte material) for the cathode, it was confirmed that the increase in the overvoltage of the battery was suppressed by providing the coating layer including the first solid electrolyte material on the surface of the cathode active material. Here, the first solid electrolyte material included in the battery is represented by the composition formula $Li_\alpha M_\beta X_\gamma$. The values of α, β, and γ are each independently a value greater than 0, M includes at least one element selected from the group consisting of metalloid elements and metal elements other than Li, and X includes at least one element selected from the group consisting of Cl and Br.

From the result of the comparative example 1 shown in Table 1, it has been confirmed that, if the halide solid electrolyte including iodine is used for the cathode and no coating layer including the first solid electrolyte material is provided, the overvoltage during the charge is a high value of 213 mV.

In addition, from the results of the inventive examples 1 to 3 and the comparative example 1, it has been confirmed that, even if the first solid electrolyte material used for the coating layer has different compositions and structures, the oxidative decomposition of the second solid electrolyte material in the electrode is suppressed. It has been confirmed that, with the oxidative decomposition, the increase in the overvoltage of the battery can be suppressed.

Inventive Example 4

[Production of Second Solid Electrolyte Material]

In an argon glove box with a dew point of −60° C. or less, $Li_2S$ and $P_2S_5$ were prepared at a molar ratio of $Li_2S:P_2S_5$=75:25. These were ground and mixed in a mortar. Then, milling processing was performed at 510 rpm for 10 hours using a planetary ball mill (manufactured by Fritsch, type P-7) to provide a glassy solid electrolyte. The glassy solid electrolyte was heat-treated at 270° C. for two hours in an inert atmosphere. In this way, $Li_2S$—$P_2S_5$, which was a glass ceramic second solid electrolyte material, was provided.

[Production of Cathode Active Material Coating Layer]

In an argon glove box with a dew point of −60° C. or less, raw material powders LiCl and $YCl_3$ were prepared at a molar ratio of $LiCl:YCl_3$=2.7:1.1. Subsequently, milling processing was performed at 600 rpm for 25 hours using a planetary ball mill (manufactured by Fritsch, type P-5) to provide a powder of the first solid electrolyte material $Li_{2.7}Y_{1.1}Cl_6$. The material of the coating layer is a first solid electrolyte material.

Mixing with an agate mortar was used to form the $Li_{2.7}Y_{1.1}Cl_6$ coating layer on the cathode active material $Li(NiCoMn)O_2$ (hereinafter, referred to as NCM). The first solid electrolyte material ($Li_{2.7}Y_{1.1}Cl_6$) and the cathode active material (NCM) were prepared at a weight ratio of 1:10 in an argon glove box. By mixing these with an agate mortar, the coated cathode active material of the inventive example 4 in which the coating layer was formed on the surface of each of the particles was provided. In other words, a coating layer was formed on at least a part of a surface of each of all or some of the plurality of particles of the cathode active material.

[Production of Cathode Material]

In the argon glove box, the second solid electrolyte material of the inventive example 4 and the coated cathode active material of the inventive example 4 were prepared at a weight ratio of 23:77. By mixing these in an agate mortar, the cathode material of the inventive example 4 was produced.

Inventive Example 5

[Production of Cathode Active Material Coating Layer]

In an argon glove box with a dew point of −60° C. or less, raw material powders LiBr and $YBr_3$ were prepared at a molar ratio of $LiBr:YBr_3$=3:1. Subsequently, milling processing was performed at 600 rpm for 25 hours using a planetary ball mill (manufactured by Fritsch, type P-7) to provide a powder of the first solid electrolyte material $Li_3YBr_6$.

The same steps as those of the inventive example 4 were performed to provide the cathode material of the inventive example 5, except for the production of the cathode active material coating layer.

Inventive Example 6

[Production of Cathode Active Material Coating Layer]

In an argon glove box with a dew point of −60° C. or less, raw material powders LiCl, $YCl_3$, $ZrCl_4$ were prepared at a molar ratio of $LiCl:YCl_3:ZrCl_4$=5:1:1. Subsequently, milling processing was performed at 600 rpm for 25 hours using a planetary ball mill (manufactured by Fritsch, type P-7) to provide a powder of the first solid electrolyte material $Li_{2.5}Y_{0.5}Zr_{0.5}Cl_6$.

The same steps as those of the inventive example 4 were performed to provide the cathode material of the inventive example 6, except for the production of the cathode active material coating layer.

Comparative Example 2

The same steps as those of the inventive example 4 were performed to provide the cathode material of the comparative example 2, except that the cathode active material coating layer was not produced and that NCM having a surface on which the coating layer was not formed was used.

Comparative Example 3

[Production of Second Solid Electrolyte Material]

In an argon glove box with a dew point of −60° C. or less, raw material powders LiBr, LiCl, LiI, $YCl_3$, and $YBr_3$ were prepared at a molar ratio of $LiBr:LiCl:LiI:YCl_3:YBr_3$=1:1:

4:1:1. Subsequently, milling processing was performed at 600 rpm for 25 hours using a planetary ball mill (manufactured by Fritsch, type P-7) to provide a powder of the second solid electrolyte material $Li_3YBr_2Cl_2I_2$.

The same steps as those of the inventive example 4 were performed to provide the cathode material of the comparative example 3, except that the cathode active material coating layer was not produced and that NCM having a surface on which the coating layer was not formed was used, and except for the production of the second solid electrolyte material.

[Production of Battery]

The following steps were performed using each of the cathode materials of the inventive examples 4 to 6 and the comparative examples 2 to 3 and $Li_2S$—$P_2S_5$ in the form of the glass ceramics.

First, in an insulating outer cylinder, 80 mg of $Li_2S$—$P_2S_5$ and 10 mg of the cathode material were stacked in this order. This was pressure-molded at a pressure of 360 MPa to provide a cathode and a solid electrolyte layer. Next, a metal In (thickness: 200 μm) was stacked on the cathode to form a cathode current collector. Next, a metal In (thickness 200 μm), a metal Li (thickness 300 μm), and a metal In (thickness 200 μm) were stacked in this order on the surface of the solid electrolyte layer opposite to the other surface which was in contact with the cathode. This was pressure-molded at a pressure of 80 MPa to produce a stacking structure composed of the cathode, the solid electrolyte layer, and an anode.

Next, stainless steel current collectors were placed on the upper and lower parts of the stacking structure, and current collector leads were attached to the current collectors.

Finally, an insulating ferrule was used to block and seal the inside of the insulating outer cylinder from the outside atmosphere to produce a battery.

As described above, the batteries of the inventive examples 4 to 6 and the comparative examples 2 to 3 were produced.

[Charge Test]

Using each of the batteries of the inventive examples 4 to 6 and the comparative examples 2 to 3, a charge test was performed under the following conditions.

The battery was placed in a constant temperature chamber at 25° C.

The battery was charged with a constant current at a current value of 70 μA at a 0.05 C rate (20 hour rate) with respect to the theoretical capacity of the battery. The charge was terminated at a voltage of 3.7V. The battery was left at rest for twenty minutes in an open circuit, and then a stabilized open circuit voltage was read. The difference between the open circuit voltage and the end voltage 3.7V was defined as an overvoltage.

As described above, the overvoltage of each of the inventive examples 4 to 6 and the comparative examples 2 to 3 was provided. The results are shown in the following Table 2.

TABLE 2

| | First solid electrolyte material (coating material) | Second solid electrolyte material | Overvoltage during charge* |
|---|---|---|---|
| Inventive Example 4 | $Li_{2.7}Y_{1.1}Cl_6$ | $Li_2S$—$P_2S_5$ | 46 mV |
| Inventive Example 5 | $Li_3YBr_6$ | $Li_2S$—$P_2S_5$ | 65 mV |
| Inventive Example 6 | $Li_{2.5}Y_{0.5}Zr_{0.5}Cl_6$ | $Li_2S$—$P_2S_5$ | 78 mV |
| Comparative Example 1 | None | $Li_2S$—$P_2S_5$ | 131 mV |
| Comparative Example 2 | None | $Li_3YBr_2Cl_2I_2$ | 186 mV |

*Dropped voltage during quiescent operation after charge

Discussion

From the results shown in Table 2, it has been confirmed that, in the battery using the sulfide solid electrolyte (one example of the second solid electrolyte material) for the cathode, the increase in the overvoltage of the battery can be suppressed by providing the coating layer including the first solid electrolyte material on the surface of the cathode active material. Here, the first solid electrolyte material included in the battery is represented by a composition formula $Li_\alpha M_\beta X_\gamma$. The values of α, β, and γ are each independently a value greater than 0, M includes at least one element selected from the group consisting of metalloid elements and metal elements other than Li, and X includes at least one element selected from the group consisting of Cl and Br.

From the results of the comparative example 2 shown in Table 2, it has been confirmed that, if the sulfide solid electrolyte is used for the cathode and the coating layer including the first solid electrolyte material is not provided, the overvoltage at the end of the charge is a high value of 131 mV.

In addition, from the results of the inventive examples 4 to 6 and the comparative example 2, it has been confirmed that even if the first solid electrolyte material used for the coating layer has different compositions and structures, the oxidative decomposition of the second solid electrolyte material in an electrode is suppressed. It has been confirmed that, with the oxidative decomposition, the increase in the overvoltage of the battery can be suppressed.

In addition, from the result of the comparative example 3, it has been confirmed that, if the cathode active material and the halide solid electrolyte including iodine are in direct contact, the overvoltage at the end of the charge is a high value of 186 mV. This is presumably because iodine was oxidized to form a resistance layer. On the other hand, from the results of the inventive examples 4 to 6, it has been confirmed that the formation of the high resistance layer due to the contact between the cathode active material and the sulfide solid electrolyte can be suppressed by coating the cathode active material with the halide solid electrolyte which does not include iodine.

INDUSTRIAL APPLICABILITY

The battery of the present disclosure can be used, for example, as an all-solid lithium secondary battery.

REFERENTIAL SIGNS LIST

1000 Cathode material
100 Second solid electrolyte particle
110 Cathode active material particle
111 Coating layer 2000 Battery
201 Cathode
202 Electrolyte layer
203 Anode

The invention claimed is:

1. A cathode material, comprising:
a cathode active material particle;
a coating layer that coats a surface of the cathode active material particle and comprises a first solid electrolyte material; and
a second solid electrolyte material particle comprising a sulfide solid electrolyte,
wherein:
the first solid electrolyte material is represented by $Li_2MgX_4$, $Li_2FeX_4$, $Li(Al_aGa_bIn_c)X_4$, $Li_3(Al_aGa_bIn_c)X_6$, where $0 \leq a \leq 1$, $0 \leq b \leq 1$, $0 \leq c \leq 1$, $a+b+c=1$, or a composition formula $Li_\alpha M_\beta X_6$,
where $2.5 \leq \alpha \leq 3$, and $1 \leq \beta \leq 1.1$ are satisfied,
M includes at least one element selected from the group consisting of Mg, Al, Ca, Sc, Ti, Zn, Ga, Sr, Y, Zr, Nb, Sn, Ba, Hf, Ta, Bi, B, Si, Ge, As, Sb, and Te, and
X includes at least one element selected from the group consisting of Cl and Br,
the sulfide solid electrolyte comprises at least one selected from the group consisting of $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$,
the cathode active material particle and the second solid electrolyte material particle are at least partly separated by the coating layer, and
the cathode active material particle comprises a lithium nickel-cobalt-manganese oxide.

2. The cathode material according to claim 1, wherein the sulfide solid electrolyte comprises $Li_2S$—$P_2S_5$.

3. A battery, comprising:
a cathode including a cathode material;
an anode; and
an electrolyte layer provided between the cathode and the anode,
wherein the cathode material comprises:
a cathode active material particle;
a coating layer that coats a surface of the cathode active material particle and comprises a first solid electrolyte material; and
a second solid electrolyte material particle comprising a sulfide solid electrolyte,
wherein:
the first solid electrolyte material is represented by $Li_2MgX_4$, $Li_2FeX_4$, $Li(Al_aGa_bIn_c)X_4$, $Li_3(Al_aGa_bIn_c)X_6$, where $0 \leq a \leq 1$, $0 \leq b \leq 1$, $0 \leq c \leq 1$, $a+b+c=1$, or a composition formula $Li_\alpha M_\beta X_6$,
where $2.5 \leq \alpha \leq 3$, and $1 \leq \beta \leq 1.1$ are satisfied,
M includes at least one element selected from the group consisting of Mg, Al, Ca, Sc, Ti, Zn, Ga, Sr, Y, Zr, Nb, Sn, Ba, Hf, Ta, Bi, B, Si, Ge, As, Sb, and Te, and
X includes at least one element selected from the group consisting of Cl and Br,
the sulfide solid electrolyte comprises at least one selected from the group consisting of $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$,
the cathode active material particle and the second solid electrolyte material particle are at least partly separated by the coating layer, and
the cathode active material particle comprises a lithium nickel-cobalt-manganese oxide, and
wherein the electrolyte layer comprises at least one sulfide solid electrolyte material selected from the group consisting of $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

* * * * *

UNITED STATES PATENT AND TRADEMARK OFFICE
CERTIFICATE OF CORRECTION

| | | |
|---|---|---|
| PATENT NO. | : 12,431,500 B2 | Page 1 of 1 |
| APPLICATION NO. | : 18/219210 | |
| DATED | : September 30, 2025 | |
| INVENTOR(S) | : Tadaaki Matsumura et al. | |

It is certified that error appears in the above-identified patent and that said Letters Patent is hereby corrected as shown below:

On the Title Page

Item [30], should be:
Jan. 26, 2018 (JP) ................................ 2018-011533
Jan. 26, 2018 (JP) ................................ 2018-011534
Sep. 18, 2018 (JP) ................................ 2018-173451

Signed and Sealed this
Eleventh Day of November, 2025

John A. Squires
*Director of the United States Patent and Trademark Office*